US010927711B2

(12) United States Patent
Tajiri et al.

(10) Patent No.: US 10,927,711 B2
(45) Date of Patent: Feb. 23, 2021

(54) TUNABLE COMPLIANT ATTACHMENT STRUCTURE

(71) Applicant: Unison Industries, LLC, Jacksonville, FL (US)

(72) Inventors: Gordon Tajiri, Waynesville, OH (US); Emily Marie Phelps, Bellbrook, OH (US); Dattu GV Jonnalagadda, Ponnur (IN); Joseph Richard Schmitt, Springfield, OH (US); Yanzhe Yang, Mason, OH (US)

(73) Assignee: Unison Industries, LLC, Jacksonville, FL (US)

( * ) Notice: Subject to any disclaimer, the term of this patent is extended or adjusted under 35 U.S.C. 154(b) by 12 days.

(21) Appl. No.: 16/015,303

(22) Filed: Jun. 22, 2018

(65) Prior Publication Data
US 2019/0128143 A1 May 2, 2019

Related U.S. Application Data

(60) Provisional application No. 62/577,400, filed on Oct. 26, 2017.

(51) Int. Cl.
*F16M 13/00* (2006.01)
*F01D 25/28* (2006.01)
*F01D 9/06* (2006.01)

(52) U.S. Cl.
CPC ............... *F01D 25/28* (2013.01); *F01D 9/06* (2013.01); *F05D 2220/32* (2013.01); *F05D 2230/31* (2013.01); *F05D 2250/61* (2013.01); *F05D 2260/94* (2013.01); *F05D 2300/501* (2013.01)

(58) Field of Classification Search
CPC ....... F16L 3/00; F16L 3/10; F16L 3/12; F16L 3/223
USPC ...................................... 248/65, 71, 73, 74.1
See application file for complete search history.

(56) References Cited

U.S. PATENT DOCUMENTS

| 3,631,738 | A | * | 1/1972 | Harper | F16B 21/02 74/502.4 |
| 4,262,409 | A | * | 4/1981 | Madej | H02G 3/0658 248/56 |
| 4,707,225 | A | | 11/1987 | Schuler | |
| 5,109,589 | A | | 5/1992 | Cramer | |
| 5,248,168 | A | * | 9/1993 | Chichester | F16L 27/1021 285/232 |

(Continued)

FOREIGN PATENT DOCUMENTS

| CN | 1126509 A | 7/1996 |
| CN | 1412449 A | 4/2003 |

(Continued)

*Primary Examiner* — Steven M Marsh
(74) *Attorney, Agent, or Firm* — McGarry Bair PC

(57) ABSTRACT

A tunable compliant mount structure for an engine such as a turbine engine can include a fluid conduit coupled to a fan casing by a connector. At a junction between the connector and the fluid conduit, a compliant mount structure can provide compliance and can be tuned to operate under variable stresses at the junction. The compliant mount structure can include a set of nested convolutions to provide compliance. The geometry of the convolutions can be used to tune the compliance, stiffness, or directionality. The tunable compliant attachment structure provides for additive in-situ manufacturing at the fluid conduit.

17 Claims, 7 Drawing Sheets

(56) References Cited

U.S. PATENT DOCUMENTS

| | | |
|---|---|---|
| 5,249,358 A | 10/1993 | Tousignant |
| 5,317,805 A | 6/1994 | Hoopman |
| 5,730,402 A | 3/1998 | Sallen |
| 6,007,692 A | 12/1999 | Herbert |
| 6,112,804 A | 9/2000 | Sachs |
| 6,602,053 B2 | 8/2003 | Subramanian |
| 6,669,393 B2 | 12/2003 | Schilling |
| RE39,327 E * | 10/2006 | Reasoner ............... F16C 1/226 74/502.4 |
| 7,674,361 B2 | 3/2010 | Cohen |
| 7,883,061 B2 | 2/2011 | Miyata et al. |
| 8,061,032 B2 | 11/2011 | Banham |
| 8,141,831 B2 * | 3/2012 | Julian .................... E03C 1/021 248/220.21 |
| 8,257,573 B1 | 9/2012 | Cohen |
| 9,528,776 B1 | 12/2016 | Roper |
| 9,752,247 B2 | 9/2017 | Cohen |
| 2002/0053253 A1 * | 5/2002 | Burger ................... F16C 1/105 74/502.6 |
| 2015/0338005 A1 * | 11/2015 | Davis .................... F16L 37/086 285/305 |
| 2016/0145755 A1 | 5/2016 | Cook |
| 2016/0313073 A1 | 10/2016 | Larsson |
| 2017/0253982 A1 | 9/2017 | Kimble |
| 2017/0274583 A1 | 9/2017 | Vernon |

FOREIGN PATENT DOCUMENTS

| | | |
|---|---|---|
| CN | 101349317 A | 1/2009 |
| CN | 103556833 A | 2/2014 |
| CN | 205118540 U | 3/2016 |
| GB | 2194552 A1 | 3/1988 |

* cited by examiner

TUNABLE COMPLIANT ATTACHMENT STRUCTURE

CROSS REFERENCE TO RELATED APPLICATIONS

This application claims the benefit of U.S. Provisional Patent Application No. 62/577,400, filed Oct. 26, 2017, which is incorporated herein by reference in its entirety.

BACKGROUND OF THE INVENTION

Turbine engines, and particularly gas or combustion turbine engines, are rotary engines that extract energy from a flow of combusted gases passing through the engine in a series of compressor stages, which include pairs of rotating blades and stationary vanes, through a combustor, and then onto a multitude of turbine stages, also including multiple pairs of rotating blades and stationary vanes.

Structural attachment features such as duct assemblies or mount structures are provided about the turbine engine and can provide support for conduits for the flow of various operating fluids to and from the turbine engine. In the compressor stages, bleed air is produced and taken from the compressor via fluid conduits. Bleed air from the compressor in the gas turbine engine can be utilized in various ways. For example, bleed air can provide pressure for the aircraft cabin, keep critical parts of the aircraft ice-free, or can be used to start remaining engines.

Fluid conduits used to carry bleed air from the compressor require rigidity under dynamic loading, flexibility under thermal loading, and that capability to operate under high and low cycle fatigue. These criteria are often antithetical and lead to compromise solutions.

BRIEF DESCRIPTION OF THE INVENTION

In an aspect, the disclosure relates to a compliant mount assembly including a conduit having an outer wall defining an interior and extending between opposing ends. A compliant mount structure has at least one convolution provided on the outer wall, and the convolution defining an attachment region within the at least one convolution. A connector attached to the attachment region.

In another aspect, the disclosure relates to a compliant mount structure for mounting a connector to an outer wall of a conduit and includes at least one convolution integrally formed in the outer wall to form a monolithic structure with the outer wall and the at least one convolution defining an attachment region within the at least on convolution. The connector attaches at the attachment region.

In yet another aspect, the disclosure relates to a method of providing compliance between a connector and a conduit including flexing at least one convolution formed integrally and unitarily with an outer wall of the conduit between opposing ends of the conduit in response to a force appliance to a connector coupled to the outer wall.

In yet another aspect, the disclosure relates to a method of forming a compliant mount structure integral with an outer wall of a conduit including electroforming the conduit having the outer wall with the at least one convolution forming the compliant mount structure defining an attachment region within the at least one convolution.

DESCRIPTION OF EMBODIMENTS OF THE INVENTION

Figure 1:
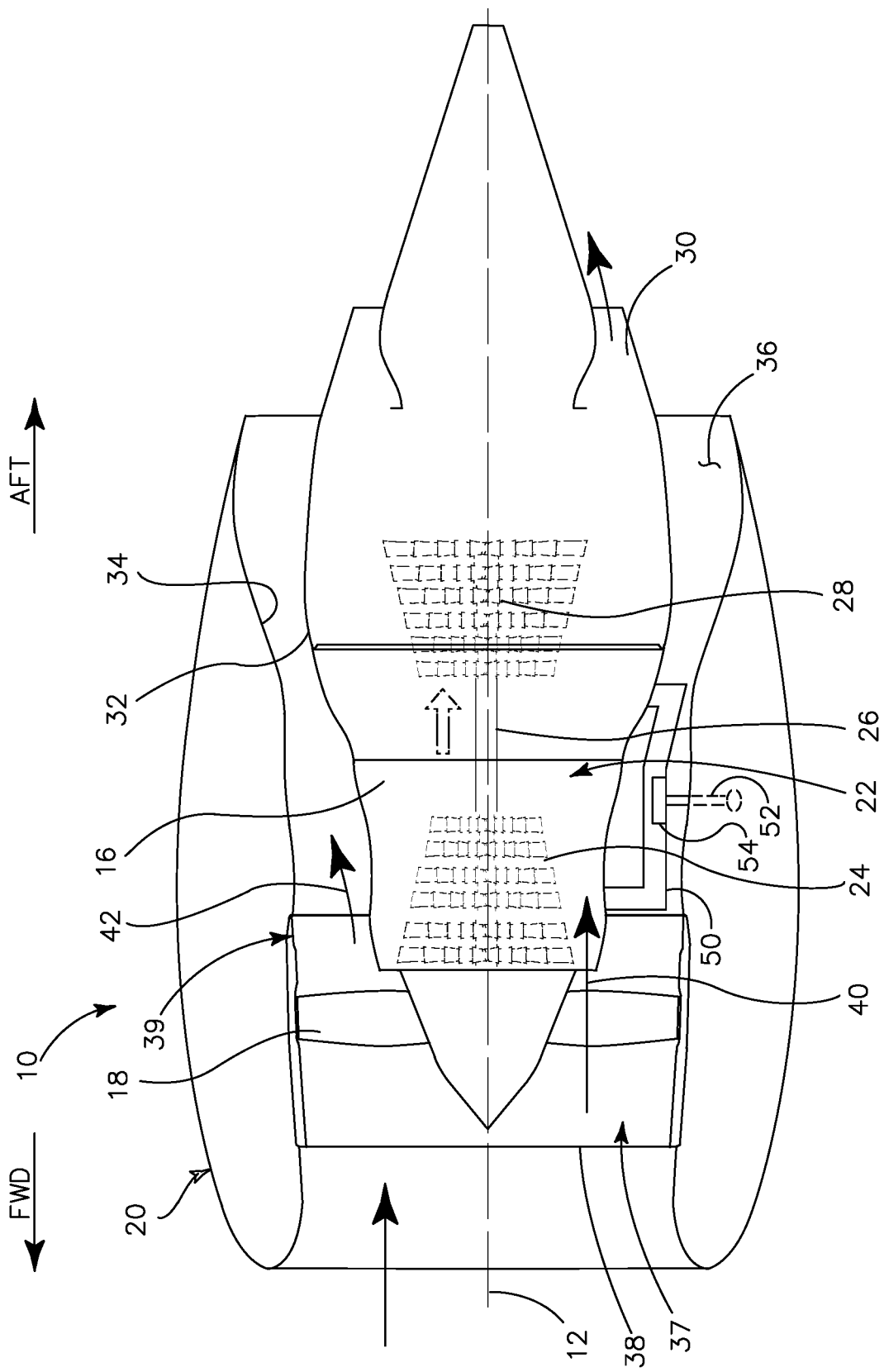
FIG. 1 is a schematic, partially cut away view of a turbine engine assembly with a fluid conduit mounted to an engine casing by a connector.

Aspects disclosed herein relate to a compliant tunable attachment structure for tuning local compliance and stiffness for connector attachment regions. The compliant tunable attachment structure can be formed as an electroformed component, having thin walls in the range of 0.030 inches to 0.050 inches (about 0.75 to 1.25 millimeters). Connectors, typically having a nominal thickness of 0.063 inches (1.60 mm), can be significantly stiffer than the attachment location of the electroformed component, which can lead to high frequency dynamic and low-cycle-fatigue thermal loading inducing high local fatigue stresses at the electroformed walls. The compliant tunable attachment structures provide for improved compliance under local stresses and loading at connector attachments to the thin electroformed walls. While the above description described particular thicknesses for electroformed walls and connectors, it should be understood that such elements are not limited to the aforementioned thicknesses, and any suitable thickness in a particular implementation is contemplated.

The compliant tunable attachment structures are described herein in the environment of a turbine engine; particularly, mounting a fluid conduit to an engine casing. It will be understood, however, that aspects of the disclosure described herein are not so limited and may have general applicability within any engine mounting elements to one another, as well as in non-aircraft applications, such as other mobile applications and non-mobile industrial, commercial, and residential applications. Furthermore, the compliant tunable attachment structure can have applications in non-engine environments, where mounting attachment features may benefit from improved loading compliance under stressed operation, variable operational temperatures, or high or low cycle fatigues, for example.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component. Additionally, as used herein, the terms "radial" or "radially" refer to a dimension extending between a center longitudinal axis of the engine and an outer engine circumference. Furthermore, as used herein, the term "set" or a "set" of elements can be any number of elements, including only one.

As used herein, the term "compliance" or "compliant" means the tendency towards being adaptable or flexible to a stress force acting on the element. A "compliant mount structure" as described herein permits movement or flexion in at least one degree of freedom, linear or rotational. For example, the compliant mount structure as described herein can be flexible to comply with a stress force action on elements at the compliant mount structure.

As used herein, the term "tunable" or "tuned" means that the structure of an element can be adapted or modified to suit particular conditions. For example, the compliant mount structure as described herein can be tuned to flex under an anticipated range of stress forces without breaking or fracturing.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Referring to FIG. 1, a turbine engine assembly 10 defines a longitudinal engine centerline 12 extending from forward to aft. A turbine engine 16, a fan assembly 18, and a nacelle 20 can be included in the turbine engine assembly 10, with portion of the nacelle 20 cut away for clarity. The turbine engine 16 can include an engine core 22 having a compressor section 24, a combustion section 26, a turbine section 28, and an exhaust section 30. An inner cowl 32 radially surrounds the engine core 22. The nacelle 20 surrounds the turbine engine 16 including the inner cowl 32 and the core engine 22. In this manner, the nacelle 20 forms an outer cowl 34 radially surrounding the inner cowl 32. The outer cowl 34 is spaced from the inner cowl 32 to form an annular passage 36 between the inner cowl 32 and the outer cowl 34. The annular passage 36 characterizes, forms, or otherwise defines a nozzle and a generally forward-to-aft bypass airflow path. A fan casing assembly 37 having an annular forward casing 38 and an aft casing 39 can form a portion of the outer cowl 34 formed by the nacelle 20 or can be suspended from portions of the nacelle 20 via struts (not shown) or other suitable mounting structures.

In operation, air flows through the fan assembly 18 and a first portion 40 of the airflow is channeled through compressor section 24 wherein the airflow is further compressed and delivered to the combustion section 26. Hot products of combustion from the combustion section 26 are utilized to drive turbine section 28 and thus produce engine thrust. The annular passage 36 is utilized to bypass a second portion 42 of the airflow discharged from fan assembly 18 around engine core 22.

A fluid conduit 50 can extend from the compressor section 24 of the engine core 22 to the turbine section 28 of the engine core 22, passing exterior of the engine core 22 through the annular passage 36. In one non-limiting example, the fluid conduit 50 can be a bypass air conduit or bleed air conduit providing unheated air to the turbine section 28, bypassing the combustion section 26. A connector 52 can mount the fluid conduit 50 to the outer cowl 34 at a compliant mount structure 54. In one example, the connector 52 can be a mount bracket.

It should be appreciated that while the fluid conduit 50 is shown as exterior of the engine core 22 and mounted to the outer cowl 34 by the connector 52, it is further contemplated that the connector 52 and the fluid conduit 50 can be positioned interior of the engine core 22, with the connector 52 mounted to the inner cowl 32, while positioned exterior of the airflow path through the engine core 22. Furthermore, any suitable mounting position for the fluid conduit 50 and connector 52 is contemplated, as may be desirable in other engines or other suitable environments. Further still, the fluid conduit 50 need not be a fluid conduit, but can be a structural member, utilized for providing improved stiffness or for mounting other engine components within the turbine engine assembly 10.

The turbine engine assembly 10 can pose unique stress management challenges, such as directional loading, thermal loading, or other stress magnitudes during engine operation. The compliant mount structure 54 can be utilized to mitigate such challenges.

Figure 2:
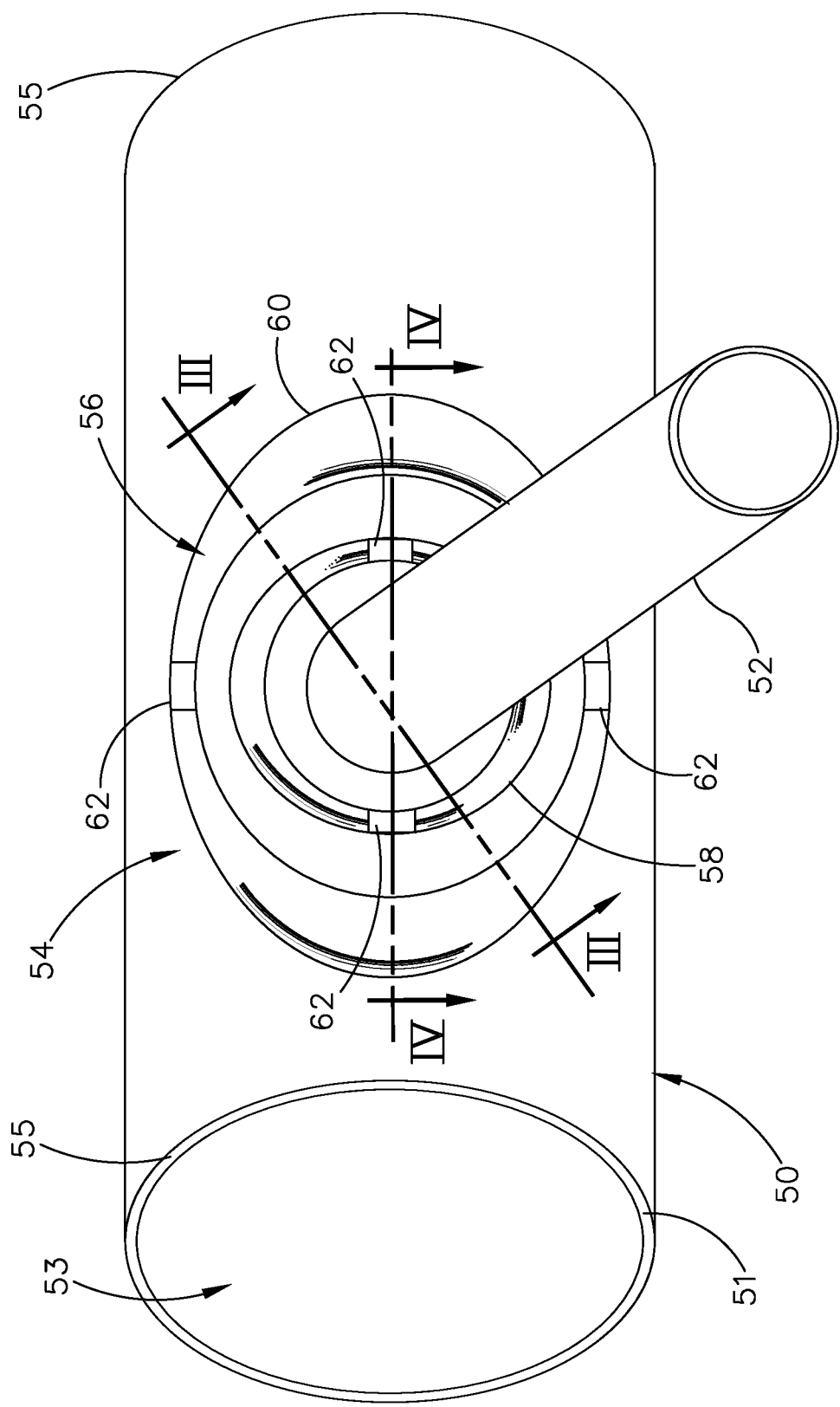
FIG. 2 is a view of the fluid conduit of FIG. 1 with the connector extending from a compliant mount structure.

Referring now to FIG. 2, the compliant mount structure 54 is provided on the fluid conduit 50 and can be formed as a portion of the fluid conduit 50. The compliant mount structure 54 can be formed integrally with the fluid conduit 50, for example, forming a unitary structure or a monolithic structure, as opposed to the combination of two distinct elements. Such a formation can be accomplished through additive manufacturing, such as 3D printing or electroforming, for example. The fluid conduit can have an outer wall 51 extending between opposing ends 55 and defining an interior 53. In one example, the compliant mount structure 54 can be formed on a flat, planar portion of the fluid conduit 50, while it is contemplated that the compliant mount structure 54 can be formed on a curved or arcuate surface, or any other surface of the fluid conduit 50 suitable for mounting the connector 52, such as at a bend or elbow of the fluid conduit 50.

A set of convolutions 56 can at least partially form the compliant mount structure 54 having an inner convolution 58 and an outer convolution 60. The convolutions 56 have substantially oval shapes, while any shape is contemplated, such as circular, triangular, curved, linear, rectilinear, or any combination thereof in non-limiting examples. The connector 52 can mount to the fluid conduit 50 interior of the set of convolutions 56. It should be appreciated that while only two convolutions 56 are shown, any number of convolutions, including one or more convolutions is contemplated. A set of stiffening bars 62 can be provided on the convolutions 56.

Figure 3:
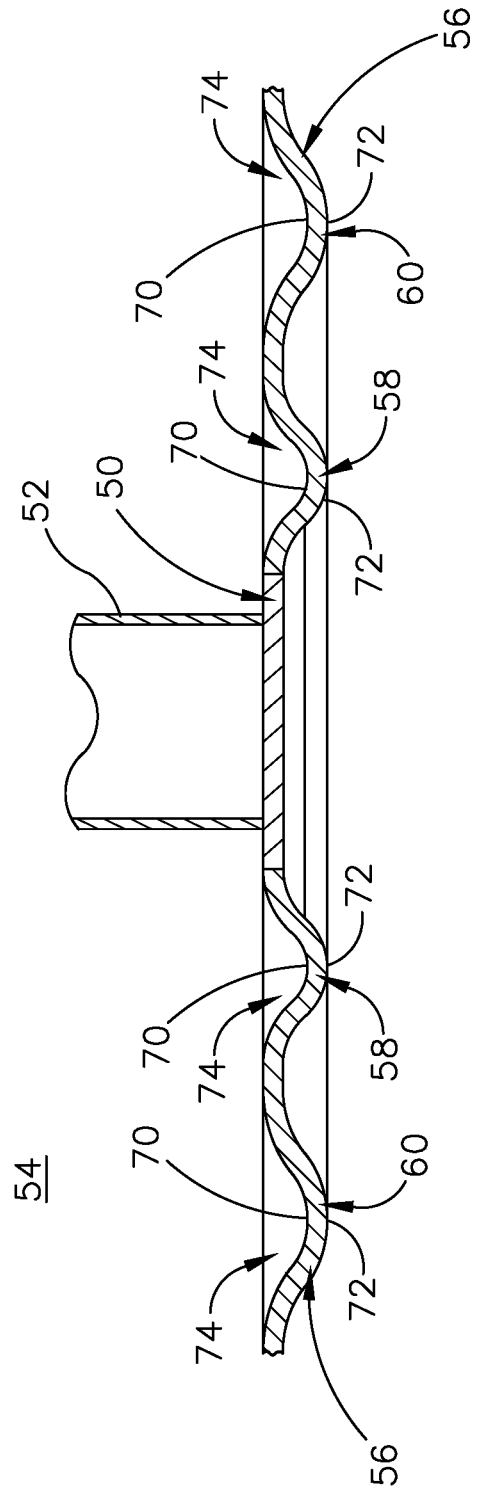
FIG. 3 is cross-sectional view of the compliant mount structure of FIG. 3 taken across section III-III.

Referring now to FIG. 3, a cross section taken across section of FIG. 2 better illustrates the geometry of the convolutions 56 having a concave side 70 and a convex side 72 on opposing sides of the compliant mount structure 54, defining a channel 74 within the fluid conduit 50 at the concave side 70. The convolutions 56 can be nested, non-uniform diaphragm convolutions, for example, with the outer convolution 60 radially exterior of the inner convolution 58 relative to the connector 52. The shaped concave and convex sides 70, 72 of the convolutions 58, 60 provide a geometry capable of improved compliance for the compliant mount structure 54. The particular geometry of the convolutions 58, 60, such as the orientation of the concave side 70, can be tailored to move or flex in a particular way or having a particular directionality. For example, the compliant mount structure 54 can tend to flex inwardly at the concave side 70, while flexing outwardly at the convex side 72. Furthermore, the orientation of the concave and convex sides 70, 72 can be used to tailor anticipated flexional directionality for the compliant mount structure 54. Such an anticipated flexional directionality can be determined using finite element analysis, for example. Therefore, different exemplary organizations, for example, can have the concave sides 70 on the bottom or the convex side 72 on the top, or any combination thereof, or varying combinations within the same convolution 56 that change along the convolution 56. While shown as having a substantially uniform wall thickness for the convolutions 56 or compliant mount structure with that of the conduit 50, it is contemplated that the convolutions 56 or compliant mount structure can be formed as portions of the conduit 50 having varying thicknesses, permitting compliance at the convolutions 56 or compliant mount structure relative to the conduit 50.

The convolutions 56 can be tailored to move in two degrees of freedom, to permit flexion of the connector 52 in any desired directionality relative to the fluid conduit 50. The connector 52 is jointed to the local wall section via in-situ electrodeposition, blazing, welding, or other metal joining method in non-limiting examples. Specifically, a set of nested convolutions with a common geometric center can have at most two rotational degrees of freedom. Based on the relative directional stiffness of a set of convolutions, each set of convolutions can share a portion of the rotation for each degree of freedom. However, a universal system having six degrees of freedom is possible if the geometric centers of the convolution sets are both displaced from each other and there are at least three sets. The range of the universal system is then limited by the magnitude of the offsets between the sets of convolutions.

Furthermore, the particular geometry of the nested, non-uniform convolutions can be tailored to a specific required stiffness, compliance, or maximum peak stress. Different thicknesses, organizations, orientations, or geometries for the convolutions 56 can be utilized to achieve such particular stiffnesses, compliances, or stresses. For example, the cross-sectional profiles for the convolutions 56 or portions thereof can be pointed, chevron, triangular, arcuate, linear, segmented, squared, or rectilinear, or any combination thereof in non-limiting examples. Furthermore, different numbers of convolutions 56, having different or variable thicknesses or cross-sectional areas can be utilized to tailor or tune the compliant mount structure 54 to the particular local stiffnesses, compliances, or anticipated stresses or loading.

Further yet, the convolutions 56 can be uniform or non-uniform. A non-uniform convolution can have a variable shape, cross-sectional area, or cross-sectional distance in non-limiting examples. Additionally, non-uniformities can include non-uniform structures, shapes, thicknesses, cross-sectional areas or cross-sectional distances in further non-limiting examples. Alternatively, a uniform convolution, for example, can have a constant cross-sectional area or thickness, around the entirety of the convolution radially outward from the connector 52, for example, such as a symmetric circular convolution.

Further still, the convolutions can include any shape, and are not limited to the oval geometry. Exemplary additional shapes can include convolutions or sets of convolutions that are circular, oval, rounded, arcuate, chevron, coiled, twisted, spiral, helical, whorl, volute, linear, rectilinear, triangular, square, sinusoidal, geometric, or unique, or any combination thereof in non-limiting examples. Similarly, the convolutions 56 need not be wholly concentric about the connector 52. Rather, the convolutions 56 can extend partially about the connector 52, having multiple discrete portions forming the convolutions (see FIG. 5, for example). Similarly, different layers of convolutions or discrete portions thereof can have different shapes. Furthermore, the connector 52 can be offset from a center of the convolutions 56, or can be positioned nearer to convolutions 56 having a specific predetermined direction or magnitude of compliance or flexion.

Such tuning or tailoring of the geometry, orientation, and organization for the compliant mount structure 54 and the convolutions 56 can provide for particularly tuning the local required stiffness or maximum peak stress based upon anticipated stresses or loading, or particular directionalities thereof. Therefore, the compliant mount structure 54 can be specifically formed to a particular local stiffness, compliance, or directionality for the compliant mount structure. Additionally, the compliant mount structure 54 can include a tunable dynamic response of the combined effects of the supported mass, such as the connector 52, and the directional stiffness of the compliant mount structure 54. Such particular tuning as described herein can be modeled with finite element simulations or analysis, in non-limiting examples, in order to comply with anticipated stresses or loading at the compliant mount structure 54.

Figure 4:
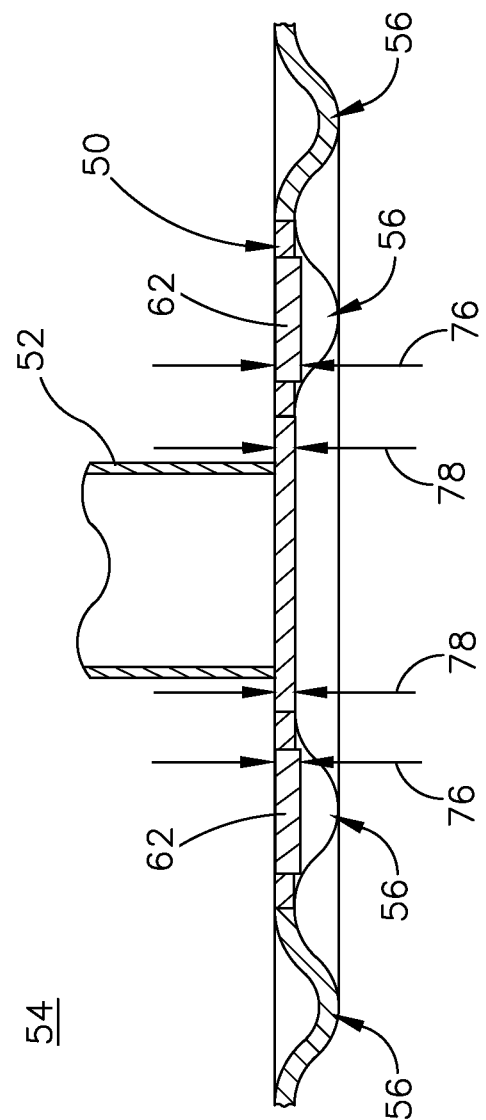
FIG. 4 is another cross-sectional view of the compliant mount structure of FIG. 2 taken across section IV-IV, showing the stiffening bars.

Referring now to FIG. 4, a cross-section of the compliant mount structure 54 taken across section IV-IV of FIG. 2 better illustrates the stiffening bars 62 as an insert-molded in-situ set of stiffening bars 62 provided within the convolutions 56. The stiffening bars 62 can be a portion of material that is directly jointed in-situ, via electrodeposition, with the rest of the convolution 56. In one example, the stiffening bars 62 can be a continuous wall section of the shape or geometry of the fluid conduit 50 through the convolution 56. The stiffening bars 62 can include a first thickness 76, and the fluid conduit 50 can include a second thickness 78. The first thickness 76 of the stiffening bars 62 can be greater than the second thickness 78 of the fluid conduit 50. Alternatively, it is contemplated that the first thickness 76 of the stiffening bars 62 can be less than the second thickness 78 of the fluid conduit 50, or having equal thicknesses 76, 78. Such variable thicknesses can provide for tailored stiffnesses at and along the stiffening bars 62, which can provide for local stiffnesses or directionality of flexion for the convolutions 56.

Figure 5:
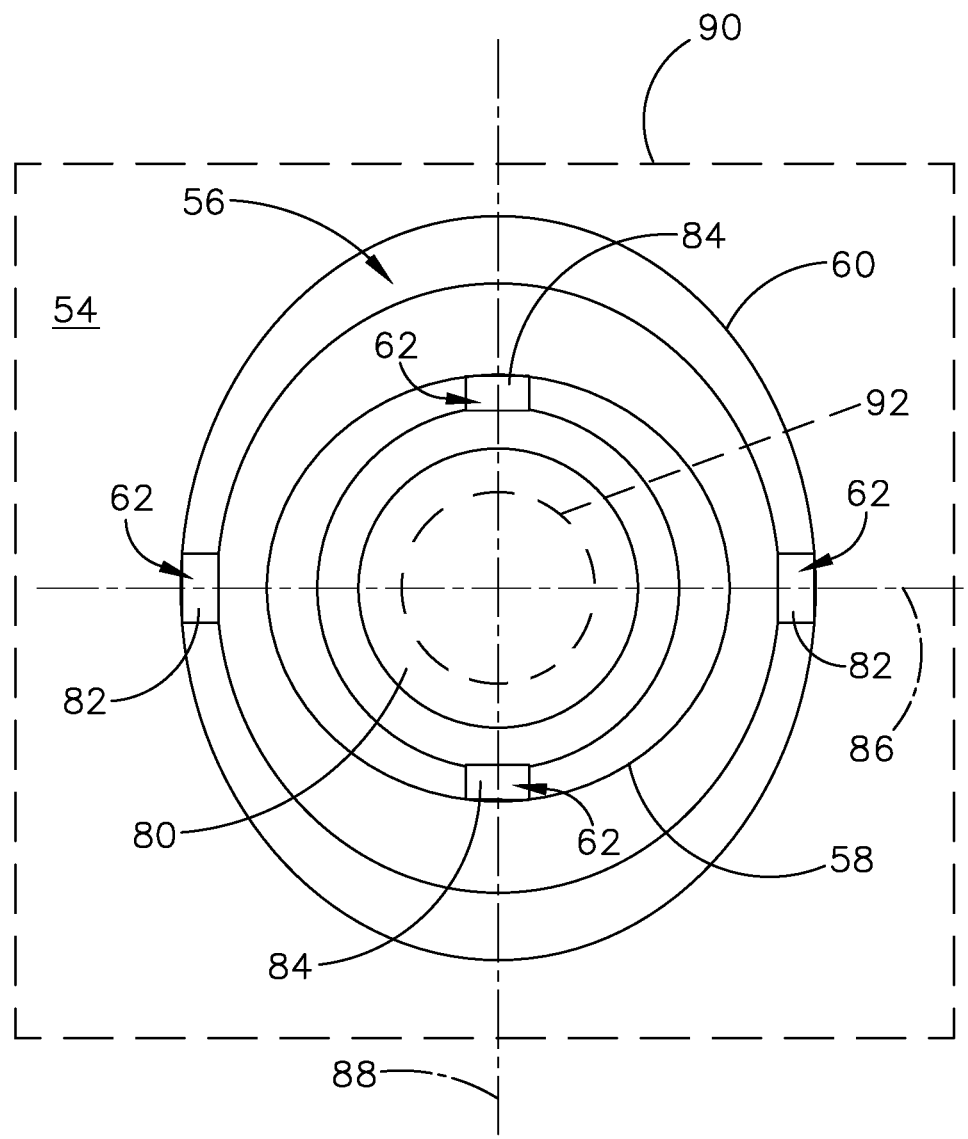
FIG. 5 is a front view of the compliant mount structure of FIG. 2 having the connector removed and illustrating directional axes defined by stiffening bars.

Referring now to FIG. 5, the compliant mount structure 54 is shown on a flat portion 90, which can be formed on the outer wall 51 of the fluid conduit 50. The connector 52 has been removed for clarity, exposing a connector attachment region 80 provided interior of the set convolutions 56. The shape of the connector attachment region 80 can be defined by the set of convolutions 56, or the set of convolutions 56 can be shaped and arranged based upon or to define a shape for the connector attachment region 80, or tailored to a particular connector 52. It is further contemplated that a portion of the connector attachment region 80 includes an optional opening 92 (shown in broken line), defining an aperture within the connector attachment region 80 for fluidly coupling the connector 52 to the fluid conduit 50 at the compliant mount structure 54, where such fluid communication may be desirable.

A first set of two stiffening bars 82 are provided on opposite sides of the outer convolution 60, and a second set of two stiffening bars 84 provided on opposite sides of the inner convolution 58, offset from the first set of stiffening bars 82. While provided on opposite sides of the convolutions 56, it should be appreciated that the stiffening bars 82, 84 can be positioned anywhere along the convolutions 56, or along the fluid conduit 50 between the convolutions 56. Furthermore, while only two stiffening bars 82, 84 are shown with each convolution 58, 60, any number of stiffening bars 82, 84, including one or more, can be utilized in any organization or location, or having any geometry. In one non-limiting, alternative example, the stiffening bars 82, 84 can be non-uniform portions of the convolutions 56, such as having an irregular shape, structure, or thickness relative to the convolution 56 or the fluid conduit 50, for example.

A first stiffened axis 86 can be defined extending linearly between the first stiffening bars 82. The first set of stiffening bars 82 can tune a directional compliance about the first stiffened axis 86 in order to meet particular stiffness or compliance requirements at maximum peak stresses in a particular direction or magnitude along or in the direction of the stiffened axis 86. Specifically, the stiffened axis 86 can limit or prevent rotation about a degree of freedom defined along the stiffened axis 86.

Similarly, a second stiffened axis 88 can be defined extending linearly between the second stiffening bars 84, which can be used to tune a second directional stiffness about the second stiffened axis 88, in addition to the first stiffened axis 86. Utilizing multiple stiffening bars 62 or multiple set of stiffening bars 62 can be used to particularly tailor directional stiffness or rotational compliance for the compliant mount structure 54.

Figure 6:
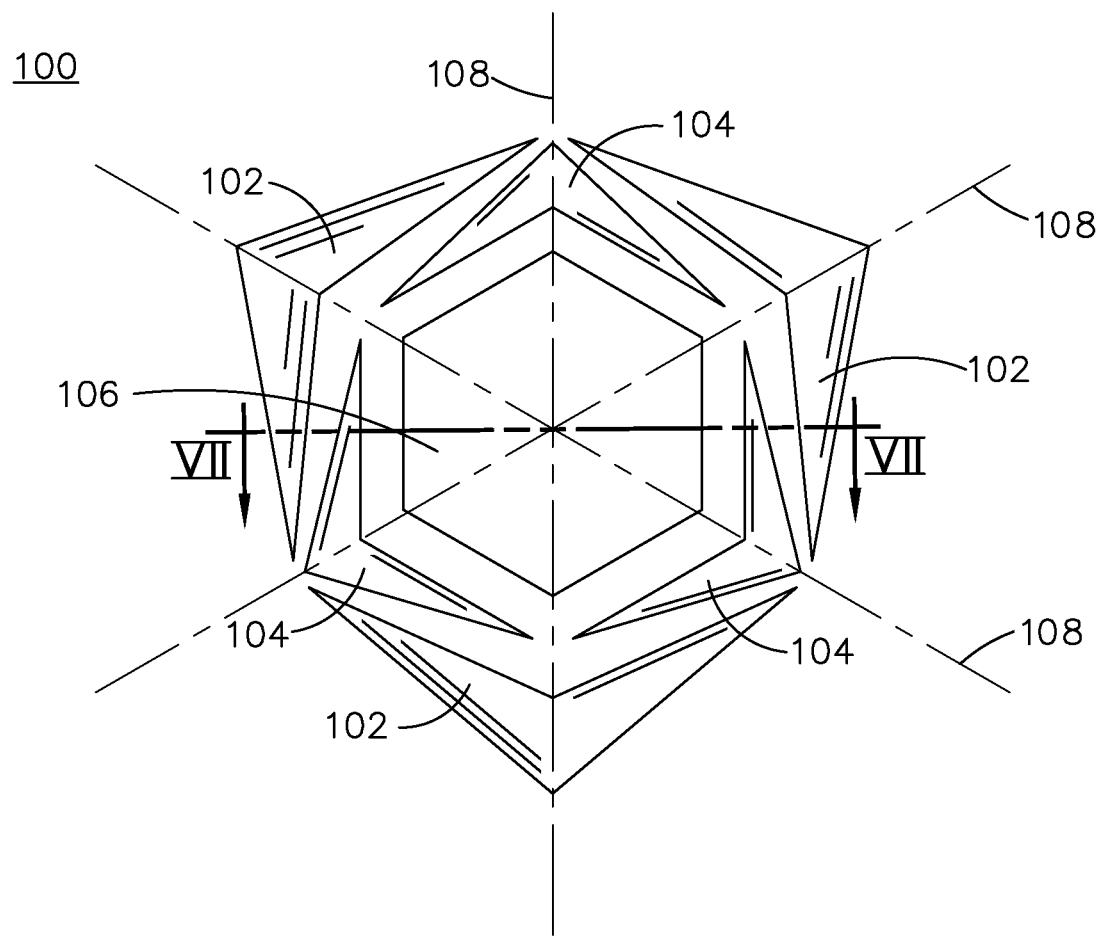
FIG. 6 is a front view of an alternative compliant mount structure.

Referring now to FIG. 6, an alternative compliant mount structure 100 can include a first set of chevron convolutions 102 and a second set of chevron convolutions 104, each having chevron shapes, while any number of sets of convolutions is contemplated. The first set of chevron convolutions 102 is positioned exterior of the second set of convolutions 104, relative to a mounting bracket attachment region 106. Each set of chevron convolutions 102, 104 includes three discrete chevron convolutions, while any number is contemplated within each individual set. The sets of chevron convolutions 102, 104 define a hexagonal shape for the mounting bracket attachment region 106, which can be tailored to a hexagonal connector, for example.

The organization of the two sets of three chevron convolutions 102, 104 defines three of flexure axes 108, providing three axes about which the compliant mount structure 100 can flex, as well as local tailored directionalities based upon the geometry of each individual chevron convolution 102, 104.

Figure 7:
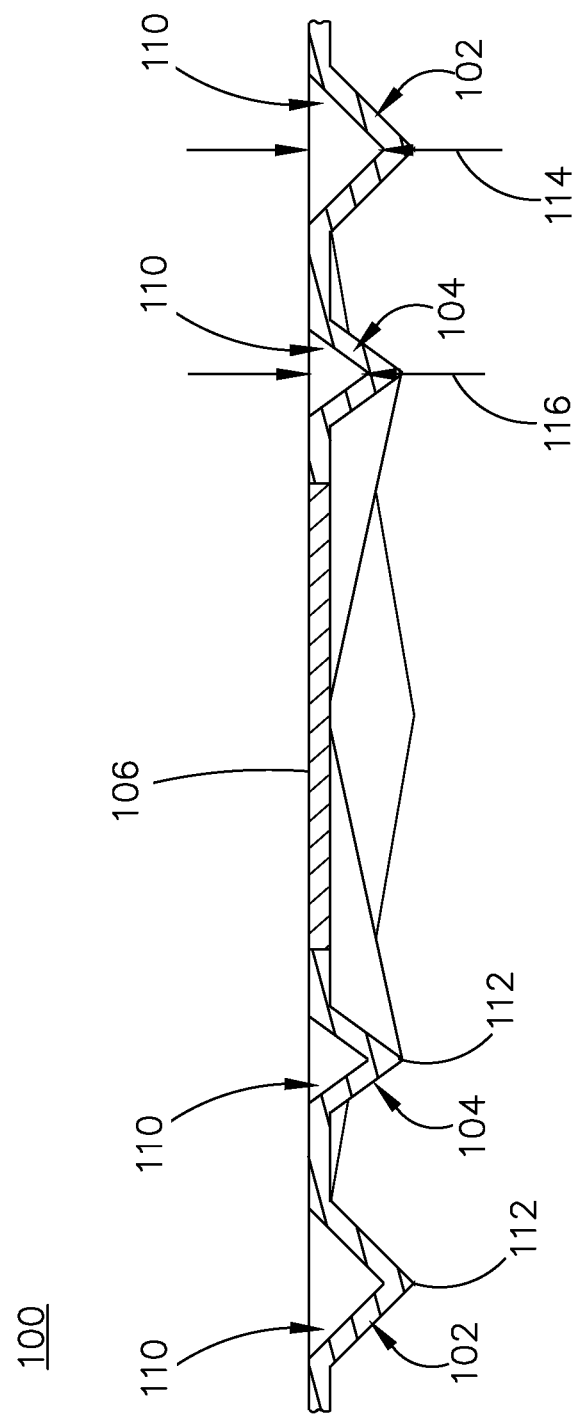
FIG. 7 is a cross-sectional view of the compliance mount structure of FIG. 6 taken across section VII-VII.

Referring now to FIG. 7, a cross-sectional view taken across section VII-VII of FIG. 6 better illustrates the geometry of the chevron convolutions 102, 104. Each chevron convolution 102, 104 is rectilinear, having a triangular profile defining a channel 110 and a point 112. The first set of chevron convolutions 102 can have a greater depth 114 than a lesser depth 116 of the second set of convolutions 104. The lesser depth 116 can provide for decreased flexion adjacent the mounting bracket attachment region 106, which can provide for increased stiffness adjacent to a connector attached to the compliant mount structure 100.

It should be understood that there is a myriad of different combination for the shape and structure of the compliant mount structure, and that the examples shown in FIGS. 2-7 are only exemplary of two such examples. For example, there can be any number of convolutions provided in the compliant mount structure. Each convolution can be separated into any number of discrete convolution segments, in order to provide discrete stiffness or directionality within the convolutions, without requiring the particular stiffening bars provided in the convolutions, or in addition to the stiffening bars. Furthermore, the convolutions can extend in any direction, interior or exterior of the fluid conduits, in order to provide further directionality for flexion of the compliant mount structure.

In one example, a method of providing compliance between a connector 52 and a conduit 50 can include flexing at least one convolution 56 formed integrally and unitarily with an outer wall 51 of the conduit 50 between opposing ends 55 of the conduit 50 in response to a force applied to a connector 52 coupled to the outer wall 51. The method can optionally include wherein flexing further comprises flexing about two convolutions 58, 60. The method can optionally include wherein the at least two convolutions 58, 60 are non-uniform. The method can optionally further include providing a directionality for flexion of the compliant mount structure 54 with at least one stiffening bar 62 providing along the at least one convolution 56. The method can optionally include wherein the at least one stiffening bar 62 includes two stiffening bars 62 defining a stiffening axis 86, 88 defining the directionality for flexion of the compliant mount structure 54. The method can optionally include wherein the compliant mount structure 54 is formed in-situ during electroforming of the conduit 50. The method can optionally include wherein the compliant mount structure 54 reduces low cycle fatigue reaction loads at the conduit 50 and the connector 52. The method can optionally include wherein the at least one convolution is electroformed in-situ with the conduit 50, and in integral or unitary with the conduit to form a monolithic structure.

In another example, a method of forming a compliant mount structure 54 integral with an outer wall 51 of a conduit can include unitarily electroforming the conduit 50 having the outer wall 51 with at least one integral convolution 56 forming the compliant mount structure 54, with the at least one convolution 56 defining an attachment region 80 within the at least one convolution 56. The method can optionally include electroforming at least one stiffening bar 62 along the at least one convolution 56. The method can optionally include wherein the at least one stiffening bar 62 includes providing a directionality for flexion of the compliant mount structure 54. The method can optionally include coupling a connector 52 to the conduit 50 at the attachment region 80. The method can optionally include wherein electroforming includes electroforming the at least one convolution 56 forming the compliant mount structure 54 between opposing ends 55 of the conduit 50. The method can optionally include wherein the at least one convolution is electroformed in-situ with the conduit 50, and in integral or unitary with the conduit to form a monolithic structure.

The compliant mount structures can be formed integrally with the fluid conduits, and can be formed by additive manufacturing such as electroforming. Electroforming the fluid conduits with the compliant mount structures provides for in-situ geometries capable of reducing or complying with local stresses during formation of the conduit. In one example, the fluid conduit having a particular geometry for the compliant mount structure can be formed in a sacrificial mandrel, and the fluid conduit and compliant mount structure can be electroformed about the mandrel. Utilizing a common mandrel electroform manufacturing process requires no additional cost or post processing for forming the compliant mount structures. Electroformed components can have thin walls in the range of 0.030 inches to 0.050 inches (about 0.75 to 1.25 millimeters), for example, while greater or lesser thicknesses are contemplated. The compliant mount structures can provide for minimizing and distributing local stresses, such as operating under high frequency dynamic and low-cycle-fatigue thermal loading, which can introduce high local fatigue stresses in the thin electroformed walls.

The tunable compliant mount structures provide for a tunable compliance for the attachment of connectors or other similar attachment members. Typical fluid delivery components are made of a uniform thickness of formed sheet metal or cylindrical tubing, and are tailored to worst-case local stresses with an over-design thickness, resulting in increased thickness with non-compliant rigidity. The tunable compliant mount structures can improve the compliance under local stresses and loading, while permitting a reduced overall thickness and weight, achievable with electroforming manufacturing. Specifically, the tunable compliant mount structure and provide for improving directional compliance and stiffness to reduce low-cycle fatigue stress and dynamic response (high-cycle fatigue). Furthermore, the compliance can be further tailored by adding directionality to the loading based upon the geometry of the particular compliant mount structure. Therefore, the compliant mount structure can minimize peak stress magnitudes, while also minimizing overall weight and assembly complexity. Minimized weight can minimize engine specific fuel consumption.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A compliant mount assembly comprising:
    a conduit having an outer wall defining an interior and extending between opposing ends;
    a compliant mount structure formed in the outer wall of the conduit having at least one convolution integrally and unitarily provided on the outer wall, and the convolution defining an attachment region along the outer wall within the at least one convolution; and
    a connector attached to the attachment region.

2. The compliant mount assembly of claim 1 wherein the compliant mount structure is formed in the outer wall of the conduit.

3. The compliant mount assembly of claim 1 wherein the at least one convolution does not circumscribe the conduit.

4. The compliant mount assembly of claim 1 wherein the at least one convolution includes two convolutions.

5. The compliant mount assembly of claim 4 wherein the two convolutions are oval-shaped.

6. The compliant mount assembly of claim 5 wherein the two convolutions are non-uniform.

7. The compliant mount assembly of claim 5 wherein the attachment region is circular.

8. The compliant mount assembly of claim 1 wherein the at least one convolution includes a set of three discrete convolutions.

9. The compliant mount assembly of claim 8 wherein the three discrete convolutions are chevron-shaped.

10. The compliant mount assembly of claim 1 further comprising at least one stiffening bar provided along the at least one convolution.

11. The compliant mount assembly of claim 10 wherein the at least one stiffening bar comprises two stiffening bars defining a stiffening axis.

12. The compliant mount assembly of claim 1 wherein the conduit includes a flat portion provided on the outer wall and the compliant mount structure is provided on the flat portion.

13. A compliant mount structure for mounting a connector to an outer wall of a conduit, the compliant mount structure comprising:
    at least one convolution integrally and unitarily formed in the outer wall to form a monolithic structure with the outer wall and the at least one convolution defining an attachment region within the outer wall at the at least one convolution;
    wherein the connector attaches to the conduit at the attachment region.

14. The compliant mount structure of claim 13 wherein the at least one convolution does not circumscribe the conduit.

15. The compliant mount structure of claim 13 wherein the at least one convolution is non-uniform.

16. The compliant mount structure of claim 13 wherein the at least one convolution is formed as a set of discrete convolutions.

17. The compliant mount structure of claim 13 further comprising at least one stiffening bar provided along the at least one convolution.

* * * * *